Jan. 23, 1934.                H. LINDNER                 1,944,353
        APPARATUS FOR TESTING THE HARDNESS OF GRINDING DISKS
                        Filed April 23, 1930
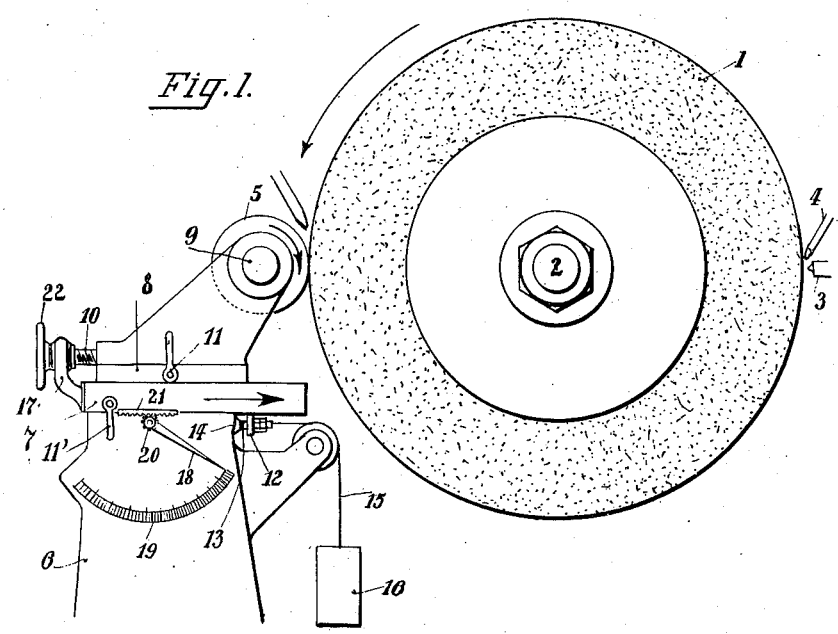
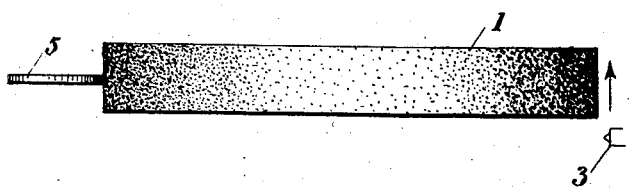
Inventor
Herbert Lindner Patented Jan. 23, 1934

1,944,353

UNITED STATES PATENT OFFICE 1,944,353

APPARATUS FOR TESTING THE HARDNESS OF GRINDING DISKS

Herbert Lindner, Berlin, Germany

Application April 23, 1930, Serial No. 446,739, and in Germany April 24, 1929

1 Claim. (Cl. 265—12)

Hitherto the hardness of grinding disks was tested by scratching the disk with a hard pointed tool and the hardness was determined by judgment.

This method can naturally lay no claim to accuracy, which also applies to the method for testing the hardness of disks by means of sand blasts.

This objection is overcome by the apparatus according to the present invention in that the revolving disk is uniformly stressed under pressure for a certain period of time by a likewise revolving tool made of hard material.

A device according to the invention is illustrated by way of example in the accompanying drawing in which:—

Fig. 1 shows a diagrammatic arrangement in side elevation and

Fig. 2 is a plan view of the disk and tool.

According to my invention, the disk 1 is mounted in a suitable manner on a spindle 2, driven from the counter shaft by a motor, not shown in the drawing but only for a certain number of revolutions.

For example this spindle is rotated, with the disk 1.200 revolutions and is then suitably stopped.

Instead of limiting the number of revolutions of the disk the running time could naturally also be fixed, whereby the same result would substantially be attained.

Before commencing the testing of the hardness it is necessary, in order to obtain a smooth surface and a concentric running of the disk, to true up this surface by means of a suitable trueing up tool 3, for example a diamond, flushing liquid or an air blast being directed onto the surface during the trueing up through a pipe 4, from a suitable pump. A roller 5 is then moved towards the circumference of the disk 1, the device which carries this roller 5 consisting of a base 6, on which a carriage 7 can be shifted in a suitable manner transversely to the axis of the grinding spindle. This carriage carries a bracket 8 for the shaft 9 of the roller 5. This bracket is adjustable perpendicularly to the axis of the grinding spindle 2 by means of a screw spindle 10 and can be fixed by a clamping device 11 on the carriage 7, which also possesses a clamping device 11', the object of which will be hereinafter described. These clamping devices 11 and 11' are the well known clamping or tommy screws.

The carriage has also a projection 12 with an adjustable stop 13 abutting against a stop 14 on the base 6. The adjustable stop 13 of the carriage is connected by a rope 15 with a weight 16, which tends to move the carriage 7 in the direction of the arrow.

The spindle 10 for adjusting the bracket 8 is mounted in an extension 17 of the carriage 7 and prevented in suitable manner from performing axial movements.

An indicating device is also provided consisting of a pointer 18, a scale 19 and a pinion 20, with which a rack 21, fastened on the carriage 7, meshes. While the disk is being trued the carriage approaches the center of the grinding disk 1 in the direction of the arrow according to the wear of the disk; its displacement can be read on a scale 19.

The operation is as follows.

After the disk has been trued, as described and brought to a standstill the carriage 7 is drawn back until its stop 13 bears against the stop 14 of the base 6. The clamping device 11' is then tightened so that the carriage 7 is held on the base or bed 6. The spindle 10 is then rotated by means of the hand wheel 22 in such a manner that the bracket 8 is advanced and the roller 5 brought up to the grinding disk. The clamping device 11' is then released so that, the weight 16 of the carriage 7 comes into operation and presses the roller 5 against the disk.

It must be seen that in this position the pointer 18 points to zero on the scale 19. If this is not the case, the hand wheel 22 must be turned until this zero position is reached. The bracket 8 is then fixed by means of the clamping device 11 so that it is rigidly held on the carriage 7.

The grinding spindle is then rotated in the direction of the arrow so that the roller rolls on the grinding disk and, owing to the pressure exerted by the weight, penetrates continually deeper into the grinding disk. After a certain number of revolutions, for example 200 revolutions, or a certain period of time, the grinding disk is stopped and the scale reading ascertained, showing how far the roller 5, which is preferably made of a very hard material such as hard steel, has penetrated into the disk, as during this penetration the carriage 7 performs a movement in the direction of the arrow, together with the rack 21, which sets the pointer 18 on the scale 19 through the pinion 20.

It is advisable to supply, if necessary, flushing liquid or an air blast through the pipe 23 to prevent as far as possible, wear of the roller 5.

Naturally this roller has an enlarged contacting surface (Fig. 2), as a sharp contacting surface would be subject to too great wear, which would have a detrimental effect on the reading of the measurement.

It is apparent that harder disks will be less affected by the roller than softer disks so that the degree of hardness of the disk can be ascertained without difficulty.

I claim:

A device for testing the hardness of grinding wheels comprising means for rotatably mounting the grinding wheel, a carriage movable towards and away from the axis of rotation of the grinding wheel, means for moving said carriage towards said axis, a slidable bracket carried by said carriage, means for sliding said bracket relative to said carriage, a testing roller carried by said bracket so as to be rotatable in the same plane as the grinding wheel and having rolling engagement with the grinding wheel, said roller being thinner than the grinding wheel, and a hardness indicator operated by said carriage to indicate the distance which said testing roller penetrates said grinding wheel.

HERBERT LINDNER.